(12) United States Patent
Park

(10) Patent No.: US 12,267,454 B2
(45) Date of Patent: Apr. 1, 2025

(54) MOBILE TERMINAL CAPABLE OF DISPLAYING INPUT METHOD EDITOR (IME) AND CONTROL METHOD FOR SAME

(71) Applicant: LG ELECTRONICS INC., Seoul (KR)

(72) Inventor: Hyeongkoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/784,966

(22) PCT Filed: May 20, 2020

(86) PCT No.: PCT/KR2020/006588
§ 371 (c)(1),
(2) Date: Jun. 13, 2022

(87) PCT Pub. No.: WO2021/235570
PCT Pub. Date: Nov. 25, 2021

(65) Prior Publication Data
US 2023/0007115 A1    Jan. 5, 2023

(51) Int. Cl.
*H04M 1/72409* (2021.01)
*G06F 3/14* (2006.01)
*G06F 9/4401* (2018.01)

(52) U.S. Cl.
CPC .......... *H04M 1/72409* (2021.01); *G06F 3/14* (2013.01); *G06F 9/4401* (2013.01)

(58) Field of Classification Search
CPC ..... H04M 1/72409; G06F 3/14; G06F 9/4401
USPC .................................................... 455/557
See application file for complete search history.

(56) References Cited

U.S. PATENT DOCUMENTS

| | | | | |
|---|---|---|---|---|
| 8,405,630 | B1 * | 3/2013 | Bi | G06F 3/04886 345/173 |
| 11,199,906 | B1 * | 12/2021 | Curtis | G06F 1/1626 |
| 2011/0242138 | A1 * | 10/2011 | Tribble | G06F 3/04886 345/173 |
| 2011/0316772 | A1 * | 12/2011 | Zhang | G06F 3/0236 345/156 |
| 2012/0162351 | A1 * | 6/2012 | Feldman | G06Q 50/12 345/173 |

(Continued)

FOREIGN PATENT DOCUMENTS

| KR | 10-2011-0123348 A | 11/2011 |
|---|---|---|
| KR | 10-2013-0074132 A | 7/2013 |

(Continued)

*Primary Examiner* — Mark G. Pannell
(74) *Attorney, Agent, or Firm* — Birch, Stewart, Kolasch & Birch, LLP

(57) ABSTRACT

A mobile terminal and a method of controlling the mobile terminal are discussed. The mobile terminal includes a wireless communication unit configured to communicate with a display device external to the mobile terminal, a first display unit, and a controller configured to control the wireless communication unit and the first display unit. The controller generates a first input process and a second input process different from the first input process. Further, in response to the second input process, the controller receives a user input signal from the display device, and outputs a second input method editor (IME) for displaying on a second display unit of the display device.

16 Claims, 7 Drawing Sheets

(56) References Cited

U.S. PATENT DOCUMENTS

| | | | |
|---|---|---|---|
| 2013/0033435 A1 | 2/2013 | Raveendran et al. | |
| 2013/0291015 A1* | 10/2013 | Pan | H04N 21/41265 725/37 |
| 2014/0052725 A1* | 2/2014 | Lee | G06F 3/0233 707/769 |
| 2014/0298161 A1* | 10/2014 | Shu | G06F 3/0481 715/234 |
| 2015/0161105 A1* | 6/2015 | Trivi | G06F 40/40 704/9 |
| 2016/0121188 A1* | 5/2016 | Lee | G06Q 90/00 700/91 |
| 2016/0170971 A1* | 6/2016 | McSherry | G06F 40/274 704/9 |
| 2017/0097765 A1* | 4/2017 | Chao | G06F 3/0237 |
| 2017/0357521 A1* | 12/2017 | Paek | G06F 3/0488 |
| 2018/0165006 A1* | 6/2018 | Iwata | G06F 3/04886 |
| 2019/0250789 A1* | 8/2019 | Li | G06F 1/3206 |
| 2022/0038444 A1* | 2/2022 | Li | H04L 63/08 |
| 2022/0398057 A1* | 12/2022 | Cheng | H04M 1/0243 |

FOREIGN PATENT DOCUMENTS

| | | | |
|---|---|---|---|
| KR | 10-2013-0085604 A | 7/2013 | |
| KR | 10-2014-0137661 A | 12/2014 | |

\* cited by examiner

MOBILE TERMINAL CAPABLE OF DISPLAYING INPUT METHOD EDITOR (IME) AND CONTROL METHOD FOR SAME

CROSS REFERENCE TO RELATED APPLICATIONS

This Application is the National Stage filing under 35 U.S.C. 371 of International Application No. PCT/KR2020/006588, filed on May 20, 2020, the entire contents of which is hereby expressly incorporated by reference into the present application.

BACKGROUND OF THE DISCLOSURE

Technical Field

Embodiments of the present disclosure relate to a mobile terminal and a method for controlling the same, and more particularly to a mobile terminal for controlling an input method editor (IME) to be output to a display device while the input method editor (IME) is being output to the mobile terminal, and a method for controlling the same.

Background Art

Generally, terminals can be classified into mobile/portable terminals and stationary terminals according to their mobility. The mobile terminals can be further classified into handheld terminals and vehicle mounted terminals according to possibility of user's direct portability.

The mobile terminals have become increasingly more functional. Examples of such functions include data and voice communication, image and video capturing through a camera, voice recording, music file playback through a speaker system, and image and video displaying through a display unit. Some mobile terminals include additional functions for supporting game playing and working as multimedia players. In particular, current mobile terminals can receive multicast signals including visual contents such as videos and television programs.

As the functions of a mobile terminal are diversified, the mobile terminal can become a multimedia player with multiple functions of capturing images or videos, playing back music files or video files, gaming, and receiving broadcasting programs.

To support and increase the functionality of the mobile terminal, the improvement of structural parts and/or software parts of the mobile terminal can be taken into account.

In addition, recently, a user may have not only a terminal but also a display device, and there is a need for the user to simultaneously use multiple displays. In addition, there is also a need for a plurality of users to simultaneously use multiple displays.

At this time, when the user controls another display device using a main terminal, there can be a problem in that the user has to share the input method editor (IME) with the terminal and the display device in a situation where the terminal and the display device are connected to each other and are simultaneously used by the user.

That is, the conventional art has not yet effectively handled simultaneous input signals to be simultaneously input to the terminal and the display device.

SUMMARY OF THE DISCLOSURE

The present disclosure is directed to a mobile terminal and a method for controlling the same that substantially obviate one or more problems due to limitations and disadvantages of the related art.

An object of the present disclosure is to provide a mobile terminal for controlling an input method editor (IME) to be output to a display unit of a display device upon receiving a signal from the display device, and a method for controlling the same.

In accordance with one aspect of the present disclosure, a mobile terminal includes a wireless communication unit configured to communicate with a display device, a first display unit, and a controller. The controller can include generating a first input process and a second input process; and receiving a first signal from the display device so that a second input method editor (IME) executed based on the second input process is controlled to be output to a second display unit of the display device.

When the controller receives the first signal in a state in which a first input method editor (IME) executed based on the first input process is output to the first display, the controller can control the second input method editor (IME) to be output to the second display unit in a state in which the output of the first input method editor (IME) is maintained.

The controller can control a first input received through the first input method editor (IME) to be output to the first display unit, and the controller can control a second input received through the second input method editor (IME) to be output to the second display unit, wherein the first input and the second input are simultaneously input.

The controller can perform a first function in the mobile terminal according to the first input, and the controller can perform a second function in the mobile terminal according to the second input so that an output screen for the second function is controlled to be output to the second display unit.

Upon receiving the first signal from the display device, the controller can confirm identification information of the first display unit and identification information of the second display unit.

Based on the confirmed identification information, the controller can control the first input method editor (IME) to be output to the first display unit, and can control the second input method editor (IME) to be output to the second display unit.

When the first input process and the second input process are generated, the controller can register the first input process and the second input process into a server.

The controller can determine whether the mobile terminal supports a multi-display function when the mobile terminal is booted, and can generate the second input process when the mobile terminal supports the multi-display function.

In accordance with another aspect of the present disclosure, a method for controlling a mobile terminal can include generating a first input process and a second input process, receiving a first signal from a display device, and controlling a second input method editor (IME) executed based on the second input process to be output to a display unit of the display device, upon receiving the first signal.

When the controller receives the first signal in a state in which a first input method editor (IME) executed based on the first input process is output to the display unit of the mobile terminal, the controller can control the second input method editor (IME) to be output to the second display unit in a state in which the output of the first input method editor (IME) is maintained.

The mobile terminal and the method for controlling the same according to the present disclosure have the following effects.

According to at least one of the embodiments of the present disclosure, the user who uses the mobile terminal can continuously use the mobile terminal in a state in which user experience (UX) of the input method editor (IME) of the mobile terminal is unchanged.

In addition, according to at least one of the embodiments of the present disclosure, the user who uses the mobile terminal can simultaneously use the input method editor (IME) output to the mobile terminal and the other input method editor (IME) output to the display device.

In addition, according to at least one of the embodiments of the present disclosure, a plurality of users can simultaneously use the input method editor (IME) output to the mobile terminal and the other input method editor (IME) output to the display device.

Additional ranges of applicability of the examples described in the present application will become apparent from the following detailed description. It should be understood, however, that the detailed description and preferred examples of this application are given by way of illustration only, since various changes and modifications within the spirit and scope of the described examples will be apparent to those skilled in the art.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

The terms such as "include" or "has" should be understood that they are intended to indicate an existence of several components, functions or steps, disclosed in the specification, and it is also understood that greater or fewer components, functions, or steps may likewise be utilized.

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings can also be applied to stationary terminals such as digital TV, desktop computers, and the like.

Figure 1A:
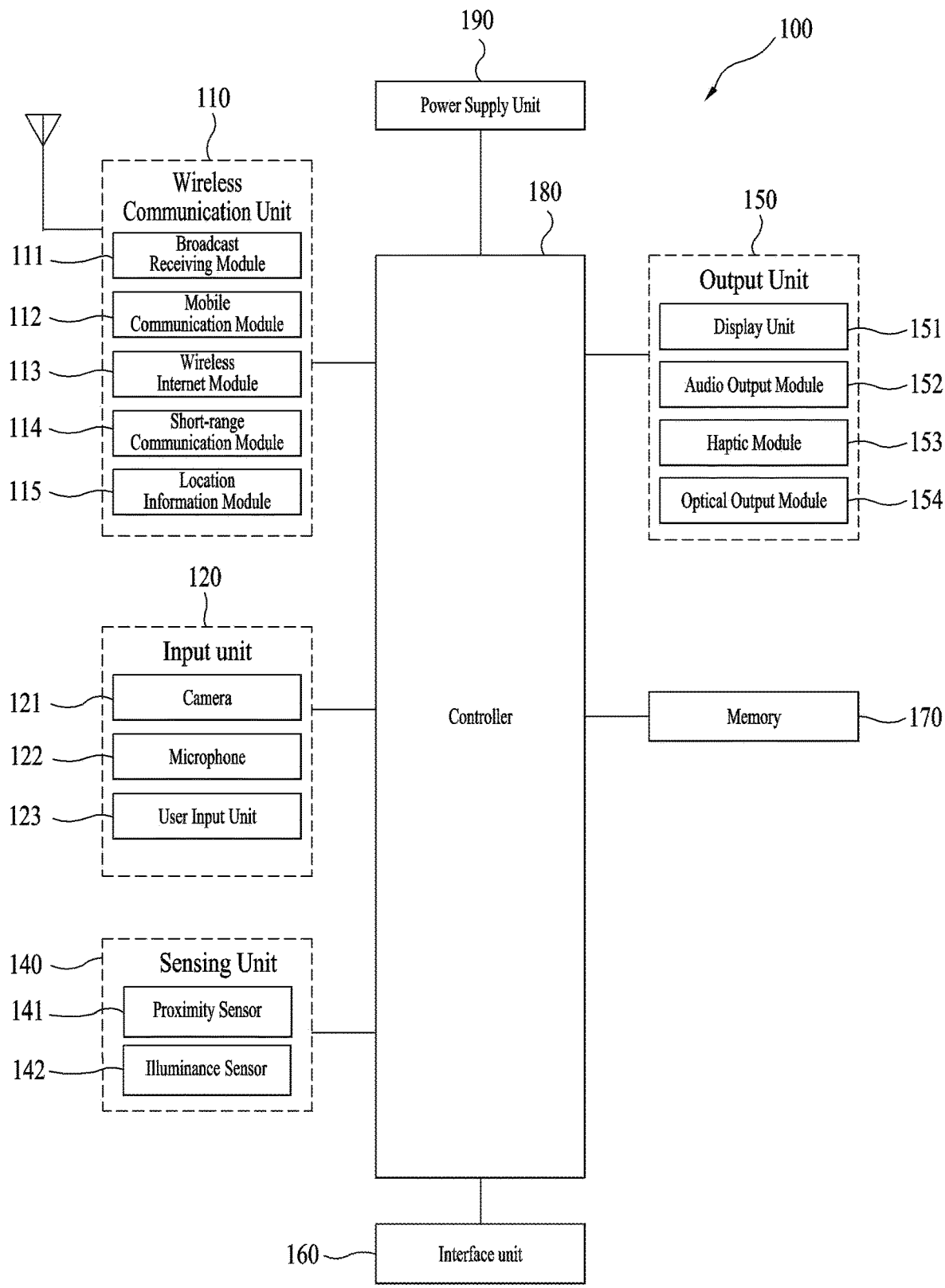
FIG. 1A is a block diagram of a mobile terminal in accordance with the present disclosure.
Figure 1B:
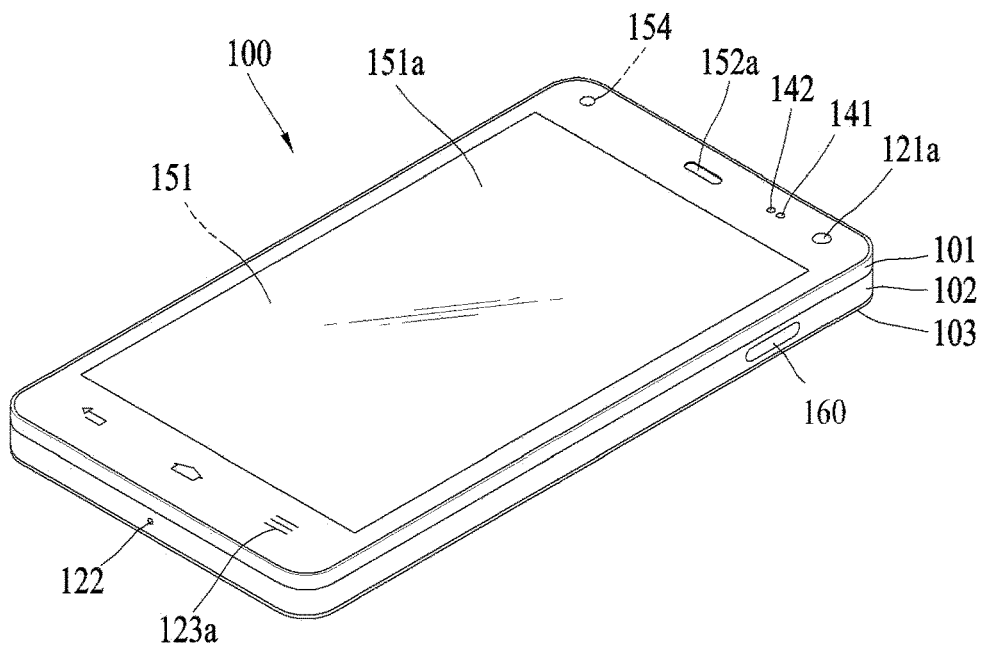
FIGS. 1B and 1C are conceptual views of one example of the mobile terminal, viewed from different directions.
Figure 1C:
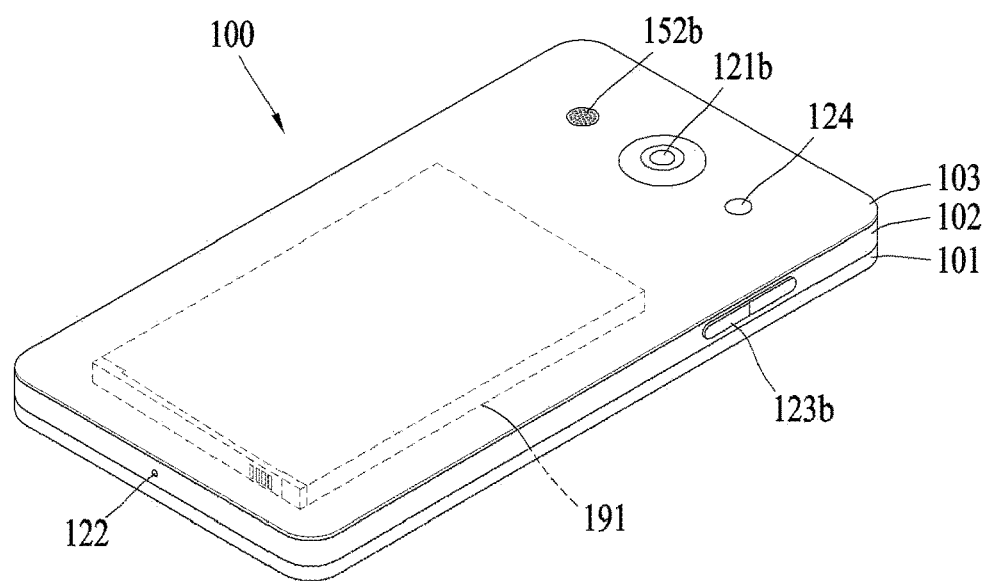

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

As shown in FIGS. 1A-1A, a mobile terminal 100 includes components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components can alternatively be implemented.

More specifically, among the above-described constituent components, the wireless communication unit 110 can include at least one module for implementing any one of communication between the mobile terminal 100 and a wireless communication system, communication between the mobile terminal 100 and another mobile terminal like the mobile terminal 100, and communication between the mobile terminal 100 and an external server. In addition, the wireless communication unit 110 can include at least one module for connecting the mobile terminal 100 to at least one network.

The wireless communication unit 110 can include at least one of a broadcast reception module 111, a mobile communication module 112, a wireless Internet module 113, a short-range communication module 114, and a location information module 115 such as a GPS module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and can be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown to include a proximity sensor 141 and an illumination sensor 142. If desired, the sensing unit 140 can alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from the sensing unit 140, and in particular, information obtained from one or more sensors of the sensing unit 140, and combinations thereof.

The output unit 150 is typically configured to output various types of information, such as audio, video, tactile output, and the like. The output unit 150 includes a display unit 151, an audio output module 152, a haptic module 153, and an optical output module 154. The display unit 151 can have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 can be configured to store application programs executed in the mobile terminal 100, data or instructions for operations of the mobile terminal 100, and the like. Some of these application programs can be downloaded from an external server via wireless communication. Other application programs can be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170.

In order to drive the application programs stored in the memory 170, the controller 180 can control at least some of the components shown in FIG. 1A. Moreover, in order to drive the application programs, the controller 180 can combine at least two of the components included in the mobile terminal 100, and can operate the combination of the components.

The power supply unit 190 can be configured to receive external power or provide internal power in order to supply appropriate power required for operating elements and components included in the mobile terminal 100. The power supply unit 190 can include a battery, and the battery can be configured to be embedded in the terminal body, or configured to be detachable from the terminal body.

At least some of the components can operate in cooperation with each other to implement an operation, control, or control method of a mobile terminal according to various embodiments described below. In addition, the operation, control, or control method of the mobile terminal can be implemented in the mobile terminal by driving at least one application program stored in the memory 170.

Hereinafter, before looking at various embodiments implemented through the mobile terminal 100 as described above, the above-listed components will be described in more detail with reference to FIG. 1A.

First, the broadcast reception module 111 of the wireless communication unit 110 can receive broadcast signals and/or broadcast related information from an external broadcast management server through a broadcast channel. The broadcast channel can include a satellite channel and a terrestrial channel. Two or more broadcast reception modules can be provided to the mobile terminal 100 for either simultaneous broadcast reception or broadcast channel switching for at least two broadcast channels.

The mobile communication module 112 can transmit and receive radio frequency (RF) signals (also called wireless signals) to and from at least one of a base station (BS), an external user equipment (UE), and a server over a mobile communication network constructed in accordance with technical standards or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.) for mobile communication.

The radio frequency (RF) signal (or wireless signal) can include various types of data according to transmission and reception of a voice call signal, a video call signal, or text/multimedia messages.

The wireless Internet module 113 refers to a module for wireless Internet access, and can be embedded in or external to the mobile terminal 100. The wireless Internet module 113 is configured to transmit and receive RF signals over a communication network according to wireless Internet technologies.

The wireless Internet technology can include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc. The wireless Internet module 113 can transmit and receive data according to at least one wireless Internet technology within a range including Internet technologies not listed above.

From the viewpoint that wireless Internet access by WiBro, HSDPA, HSUPA, GSM, CDMA, WCDMA, LTE, LTE-A, etc. is conducted through a mobile communication network, the wireless Internet module 113 performing the wireless Internet access through the mobile communication network can be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal like the mobile terminal 100, or communications between the mobile terminal and a network where another mobile terminal like the mobile terminal 100 (or an external server) is located, via wireless area networks. One example of the wireless area networks is a wireless personal area networks.

In some embodiments, another mobile terminal (which can be configured similarly to the mobile terminal 100) can be a wearable device, for example, a smart watch, a smart glass or a head mounted display (HMD), which is able to exchange data with the mobile terminal 100 (or otherwise cooperate with the mobile terminal 100). The short-range communication module 114 can sense or recognize the wearable device, and permit communication between the wearable device and the mobile terminal 100. In addition, when the sensed wearable device is a device which is authenticated to communicate with the mobile terminal 100, the controller 180, for example, can cause transmission of data processed in the mobile terminal 100 to the wearable device via the short-range communication module 114. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 can alternatively or additionally function with any of the other modules of the wireless communication unit 110 to obtain data related to the position of the mobile terminal.

As one example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 can be configured to permit various types of input to the mobile terminal 120. Examples of such input include audio, image, video, data, and user input. Image and video input is often obtained using one or more cameras 121. Such cameras 121 can process image frames of still pictures or video obtained by image sensors in a video or image capture mode. The processed image frames can be displayed on the display unit 151 or stored in the memory 170. In some cases, the cameras 121 can be arranged in a matrix configuration to permit a plurality of images having various angles or focal points to be input to the mobile terminal 100. As another example, the cameras 121 can be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 can include assorted noise removing algorithms to remove unwanted noise generated in the course of receiving the external audio.

The user input unit 123 is a component that permits input by a user. Such user input can enable the controller 180 to control operation of the mobile terminal 100. The user input unit 123 can include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input can be a virtual key or a soft key, which is displayed on a touch screen through software processing, or a touch key which is located on the mobile terminal at a location that is other than the touch screen. On the other hand, the virtual key or the visual key can be displayed on the touch screen in various shapes, for example, graphic, text, icon, video, or a combination thereof The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 can be implemented using any of a variety of sensors, some of which will now be described in more detail.

The proximity sensor 141 can include a sensor to sense presence or absence of an object approaching a surface, or an object located near a surface, by using an electromagnetic field, infrared rays, or the like without a mechanical contact. The proximity sensor 141 can be arranged at an inner region of the mobile terminal covered by the touch screen, or near the touch screen.

The proximity sensor 141, for example, can include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) can also be categorized as a proximity sensor.

The term "proximity touch" can be referred to herein to denote the scenario in which a pointer is positioned to be proximate to the touch screen without contacting the touch screen. The term "contact touch" can be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 can sense proximity touch, and proximity touch patterns (for example, distance, direction, speed, time, position, moving status, and the like).

In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as the display unit 151, using any of a variety of touch methods. Examples of such touch methods include a resistive type, a capacitive type, an infrared type, and a magnetic field type, among others.

As one example, the touch sensor can be configured to convert changes of pressure applied to a specific part of the display unit 151, or convert capacitance occurring at a specific part of the display unit 151, into electric input signals. The touch sensor can also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals can be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input can be decided based on a current operating state of the mobile terminal 100 or a currently executed application program, for example.

The touch sensor and the proximity sensor can be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor can be implemented to recognize position information relating to a touch object using ultrasonic waves. The controller 180, for example, can calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source can be calculated using this fact. For instance, the position of the wave generation source can be calculated using the time difference from the time that the ultrasonic wave reaches the sensor based on the light as a reference signal.

The camera 121 typically includes at least one of a camera sensor (e.g., CCD, CMOS etc.), a photo sensor (or image sensors), and a laser sensor.

Implementing the camera 121 with a laser sensor can allow detection of a touch of a physical object with respect to a 3D stereoscopic image. The photo sensor can be laminated on, or overlapped with, the display device. The photo sensor can be configured to scan movement of the physical object in proximity to the touch screen. In more detail, the photo sensor can include photo diodes and transistors at rows and columns to scan content received at the photo sensor using an electrical signal which changes according to the quantity of applied light. Namely, the photo sensor can calculate the coordinates of the physical object according to variation of light to thus obtain position information of the physical object.

The display unit 151 is generally configured to output information processed in the mobile terminal 100. For example, the display unit 151 can display execution screen information of an application program executing at the mobile terminal 100 or user interface (UI) and graphic user interface (GUI) information in response to the execution screen information.

In some embodiments, the display unit 151 can be implemented as a stereoscopic display unit for displaying stereoscopic images. A typical stereoscopic display unit can employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data can be obtained from any of a number of different sources, such that the audio data can be received from the wireless communication unit 110 or can have been stored in the memory 170. The audio data can be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 can also be implemented as a receiver, a speaker, a buzzer, or the like.

The haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 can output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 can be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like.

A signal output by the optical output module 154 can be implemented in such a manner that the mobile terminal emits monochromatic light or light with a plurality of colors. The signal output can be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 can include wired or wireless headset ports, external power supply ports, wired or wireless data ports, memory card ports, ports for connecting a device having an identification module, audio input/output (I/O) ports, video I/O ports, earphone ports, or the like.

The identification module can be a chip that stores various information for authenticating authority of using the mobile terminal 100 and can include a user identity module (UIM), a subscriber identity module (SIM), a universal subscriber identity module (USIM), and the like. In addition, the device having the identification module (also referred to herein as an "identifying device") can take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or can serve as a passage to allow various command signals input by the user from the cradle to be transferred to the mobile terminal there through. Various command signals or power input from the cradle can operate as signals for recognizing that the mobile terminal is properly mounted on the cradle.

The memory 170 can store programs to support operations of the controller 180 and store input/output data (for example, phonebook, messages, still images, videos, etc.). The memory 170 can store data related to various patterns of vibrations and audio which are output in response to touch inputs on the touch screen.

The memory 170 can include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 can include a battery, which is typically rechargeable or be detachably coupled to the terminal body for charging.

The power supply unit 190 can include one or more connection ports. The connection port can be configured as one example of the interface unit 160 to which an external charger for supplying power to recharge the battery is electrically connected.

As another example, the power supply unit 190 can be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein can be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 can alternatively be implemented in any of a variety of different configurations. Examples of such configurations can include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case can be additionally positioned between the front case 101 and the rear case 102.

The display unit 151 is shown located on the front side of the terminal body to output information. As illustrated, a window 151a of the display unit 151 can be mounted to the front case 101 to form the front surface of the terminal body together with the front case 101.

In some embodiments, electronic components can also be mounted to the rear case 102. Examples of such electronic components include a detachable battery 191, an identification module, a memory card, and the like. A rear cover 103 is shown as covering the electronic components, and this cover can be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 can also be completely shielded by the rear cover 103. In some embodiments, the rear cover 103 can include an opening for externally exposing a camera 121b or an audio output module 152b.

The cases 101, 102, 103 can be formed by injection-molding synthetic resin or can be formed of a metal, for example, stainless steel (STS), aluminum (Al), titanium (Ti), or the like.

As an alternative to the example in which the plurality of cases form an inner space for accommodating components, the mobile terminal 100 can be configured such that one case forms the inner space. In this example, such a mobile terminal having a uni-body is formed in such a manner that synthetic resin or metal extends from a side surface to a rear surface.

If desired, the mobile terminal 100 can include a waterproofing unit for preventing introduction of water into the terminal body. For example, the waterproofing unit can include a waterproofing member which is located between a window 151a and the front case 101, between the front case 101 and the rear case 102, or between the rear case 102 and the rear cover 103, to hermetically seal an inner space when those cases are coupled.

The mobile terminal 100 can include the display unit 151, first and second audio output units 152a and 152b, the proximity sensor 141, the illumination sensor 142, the optical output unit 154, first and second cameras 121a and 121b, first and second manipulation units 123a and 123b, the microphone 122, the interface unit 160, etc.

Referring to FIGS. 1B and 1C, the display unit 151, the first audio output unit 152a, the proximity sensor 141, the illumination sensor 142, the optical output unit 154, the first camera 121a, and the first manipulation unit 123a can be disposed at a front surface of a body frame of the mobile terminal 100. The second manipulation unit 123b, the microphone 122, and the interface unit 160 can be disposed at a side surface of the body frame (hereinafter referred to as a terminal body) of the mobile terminal 100. The second audio output unit 152b and the second camera 121b can be disposed at a rear surface of the body frame of the mobile terminal 100.

However, the above-described components are not limited to this arrangement. The above-described components can be excluded or replaced as needed, or can be disposed at other surfaces as needed. For example, the first manipulation unit 123a may not be disposed at the front surface of the terminal body, and the second audio output unit 152b can be disposed at the side surface of the terminal body rather than the rear surface of the terminal body.

The display unit 151 can be configured to output information processed in the mobile terminal 100. For example, the display unit 151 can display execution screen information of the application program executed in the mobile terminal 100 or user interface (UI) and graphical user interface (GUI) information in response to the execution screen information.

The display unit 151 outputs information processed in the mobile terminal 100. The display unit 151 can be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 can be implemented using two display devices, which can implement the same or different display technology. For instance, a plurality of the display units 151 can be arranged on one side, either spaced apart from each other, or these devices can be integrated, or these devices can be arranged on different surfaces.

The display unit 151 can also include a touch sensor which senses a touch input received at the display unit. When a touch is input to the display unit 151, the touch sensor can be configured to sense this touch and the controller 180, for example, can generate a control command or other signal corresponding to the touch. The content which is input in the touching manner can be a text or numerical value, or a menu item which can be indicated or designated in various modes.

The touch sensor can be configured in a form of a film having a touch pattern, disposed between the window 151a and a display on a rear surface of the window 151a, or a metal wire which is patterned directly on the rear surface of the window 151a. Alternatively, the touch sensor can be integrally formed with the display. For example, the touch sensor can be disposed on a substrate of the display or within the display.

The display unit 151 can also form a touch screen together with the touch sensor. Here, the touch screen can serve as the user input unit 123 (see FIG. 1A). Therefore, the touch screen can replace at least some of the functions of the first manipulation unit 123a.

The first audio output module 152a can be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which can be manipulated by a user to provide input to the mobile terminal 100. The first and second manipulation units 123a and 123b can also be commonly referred to as a manipulating portion, and can employ any tactile method that allows the user to perform manipulation such as touch, push, scroll, or the like. The first and second manipulation units 123a and 123b can also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Referring to FIG. 1B, input received at the first and second manipulation units 123a and 123b can be used in various ways. For example, the first manipulation unit 123a can be used by the user to provide an input to a menu, home key, cancel, search, or the like, and the second manipulation unit 123b can be used by the user to provide an input to control a volume level being output from the first or second audio output modules 152a or 152b, to switch to a touch recognition mode of the display unit 151, or the like.

As another example of the user input unit 123, a rear input unit can be located on the rear surface of the terminal body. The rear input unit can be manipulated by a user to provide input to the mobile terminal 100. The input can be used in a variety of different ways. For example, the rear input unit can be used by the user to provide an input for power on/off, start, end, scroll, control volume level being output from the first or second audio output modules 152a or 152b, switch to a touch recognition mode of the display unit 151, and the like. The rear input unit can be configured to permit touch input, a push input, or combinations thereof.

The rear input unit can be located to overlap the display unit 151 of the front side in a thickness direction of the terminal body. As one example, the rear input unit can be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit can implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor can also be installed in the display unit 151 or implemented in the user input unit 123.

The microphone 122 is shown located at an end of the mobile terminal 100, but other locations are possible. If desired, multiple microphones can be implemented, with such an arrangement permitting the receiving of stereo sounds.

The interface unit 160 can serve as a path allowing the mobile terminal 100 to interface with external devices. For example, the interface unit 160 can include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 can be implemented in the form of a socket for accommodating an external card, such as Subscriber Identification Module (SIM), User Identity Module (UIM), or a memory card for information storage.

The second camera 121b is shown as being located at the rear side of the terminal body and includes an image capturing direction that is substantially opposite to the image capturing direction of the first camera unit 121a. If desired, the second camera 121a can alternatively be located at other locations, or made to be moveable, in order to have a different image capturing direction from that which is shown.

The second camera 121b can include a plurality of lenses arranged along at least one line. The plurality of lenses can also be arranged in a matrix configuration. The cameras can be referred to as an "array camera." When the second camera 121b is implemented as an array camera, images can be captured in various manners using the plurality of lenses and images with better qualities.

As shown in FIG. 1C, a flash 124 is shown as being adjacent to the second camera 121b. When an image of a subject is captured with the camera 121b, the flash 124 can illuminate the subject.

As shown in FIG. 1B, the second audio output module 152b can be located on the terminal body. The second audio output module 152b can implement stereophonic sound functions in conjunction with the first audio output module 152a, and can be also used for implementing a speaker phone mode for call communication.

At least one antenna for wireless communication can be located on the terminal body. The antenna can be installed in the terminal body or formed by the case. For example, an antenna which configures a part of the broadcast receiving module 111 can be retractable into the terminal body. Alternatively, an antenna can be formed using a film attached to an inner surface of the rear cover 103, or a case that includes a conductive material.

The power supply unit 190 for supplying power to the mobile terminal 100 can include the battery 191, which is mounted in the terminal body or detachably coupled to an outside of the terminal body.

The battery 191 can receive power via a power source cable connected to the interface unit 160. Also, the battery 191 can be recharged in a wireless manner using a wireless charger. Wireless charging can be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 can be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch can cooperate with the display unit 151 to extend the function of the mobile terminal 100. Another example of the accessory is a touch pen for assisting or extending a touch input to a touch screen.

Hereinafter, embodiments related to a control method that can be implemented in the above-described mobile terminal will be described with reference to the accompanying drawings. Those skilled in the art will appreciate that the present disclosure can be carried out in other specific ways than those set forth herein without departing from the spirit and essential characteristics of the present disclosure.

The mobile terminal and the display device to be described in FIGS. 2 to 6 can be implemented as the mobile terminal 100 shown in FIGS. 1A to 1C. That is, the mobile terminal and the display device are described separately from each other for convenience of description, and the display device can also be implemented as the mobile terminal 100 shown in FIGS. 1A to 1C.

Embodiments of the present disclosure will now be described with reference to FIGS. 2 to 6. In describing and understanding of the embodiments of the present disclosure below, reference can be made to the contents described above in relation to FIGS. 1A to 1C.

Figure 2:
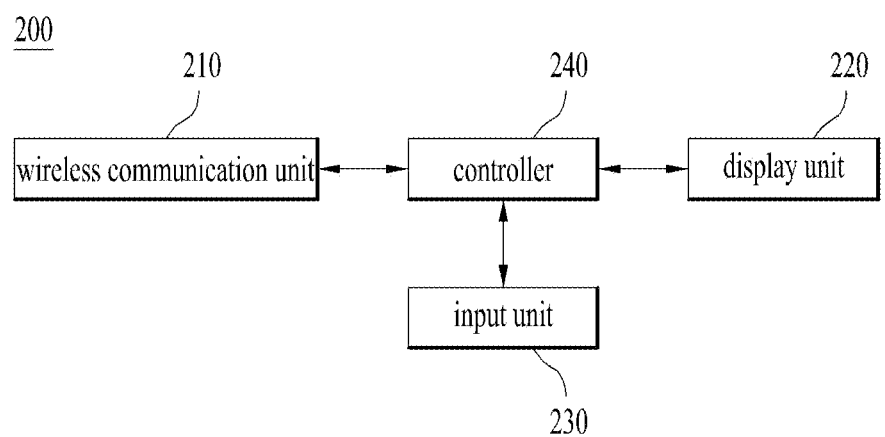
FIG. 2 is a block diagram illustrating constituent modules of a mobile terminal according to an embodiment of the present disclosure.

FIG. 2 is a block diagram illustrating constituent modules of a mobile terminal 200 according to an embodiment of the present disclosure.

Referring to FIG. 2, the mobile terminal 200 according to an embodiment of the present disclosure can include a wireless communication unit 210, a display unit 220, an input unit 230, and a controller 240.

The wireless communication unit 210 can include one or more modules that enable communication between the mobile terminal and the external part. Here, the external part can include an external device and an external server. In addition, the communication unit 210 can be implemented as the wireless communication unit 110 shown in FIG. 1A, but all functions performed by the wireless communication unit 110 can be performed through a wired cable.

In one embodiment of the present disclosure, the wireless communication unit 210 can communicate with a display device. That is, the wireless communication unit 210 of the mobile terminal 200 can communicate with a wireless communication unit of the display device. For example, the mobile terminal 200 and the display device are connected to each other through the same Wi-Fi to perform communication by sharing the wireless Internet communication network, or can communicate with each other through technology such as Bluetooth, an RFID, an NFC, etc. which are short-range communication modules.

In one embodiment of the present disclosure, the wireless communication unit 210 can receive a signal from the display device. In this case, the signal received from the display device can correspond to a control signal for outputting the input method editor (IME) to the display device. In addition, according to one embodiment of the present disclosure, the wireless communication unit 210 can transmit a signal for controlling the input method editor (IME) to be output to a display unit of the display device upon receiving a control command from the controller 240 of the mobile terminal 200. More detailed embodiments of the present disclosure will be described in detail with reference to FIGS. 3 and 4.

According to one embodiment of the present disclosure, the wireless communication unit 210 can register an input process into the server when an input process is generated in the mobile terminal 200. In addition, according to one embodiment of the present disclosure, when the input process is generated in the display device, the wireless communication unit 210 can receive a signal for the input process generated in the display device, and can register the input process into the server.

Of course, a wireless communication unit of the display device can directly register the input process into the server. That is, the following description will be mainly described centering upon the wireless communication unit 210 of the mobile terminal 200, but the display device can also include the wireless communication unit, so that the wireless communication unit of the display device can perform the same role as the wireless communication unit 210 of the mobile terminal 200.

The display unit 220 of the mobile terminal 200 can display visual information. The visual information can include text, an indicator, an icon, content, an application, an image, a video, etc. In addition, the display unit 220 can output visual information to the screen based on a control command of the controller 240. In addition, the display unit 220 can be implemented as the display 151 of FIG. 1A.

In one embodiment of the present disclosure, the display unit 220 can output an input method editor (IME) based on the control of the control unit 240 of the mobile terminal 200. At this time, the display unit 220 can output an input method editor (IME) based on identification (ID) information confirmed by the controller 240. In addition, the display unit 200 can output an input signal that is input through the input method editor (IME) to the display unit 220.

In addition, according to one embodiment of the present disclosure, the display unit 200 can output an output screen according to a function performed based on the control of the controller 240 of the mobile terminal 200.

In the following description, the display unit 220 of the mobile terminal 200 can be referred to as a first display unit, and the display unit of the display device can be referred to as a second display unit, for convenience of description and better understanding of the present disclosure. However, the scope or spirit of the present disclosure is not limited thereto, and the second display unit can also be implemented as the display 151 of FIG. 1A and the display unit 220 of FIG. 2.

The input unit 230 of the mobile terminal 200 can receive various user-input signals for the mobile terminal 200, and can transmit the result of inputs so that the controller 240 can perform an operation corresponding to the input signal. In one embodiment of the present disclosure, the input unit 230 is provided on the display unit 220 to be implemented as a touch screen. In addition, according to one embodiment of the present disclosure, the input unit 230 can be implemented as the input unit 120 and the sensing unit 140 of FIG. 1A.

According to one embodiment of the present disclosure, the input unit 230 can sense touch input from the user. At this time, the input unit 230 can sense a touch point at which the touch input is sensed, the touched area, the touched pressure, etc.

In addition, according to one embodiment of the present disclosure, an input unit of the display device can receive an input signal and transmit the input signal to the mobile terminal 200.

The controller 240 can process data, can control each unit of the above-described mobile terminal, and can control data transmission/reception between the plurality of units. In the present disclosure, the controller 240 can be implemented as the controller 180 of FIG. 1A.

According to one embodiment of the present disclosure, operations performed by the mobile terminal 200 can be controlled by the controller 240. For convenience of description, in the following description and drawings, the above-described operations are collectively described as being performed/controlled by the mobile terminal.

Figure 3:
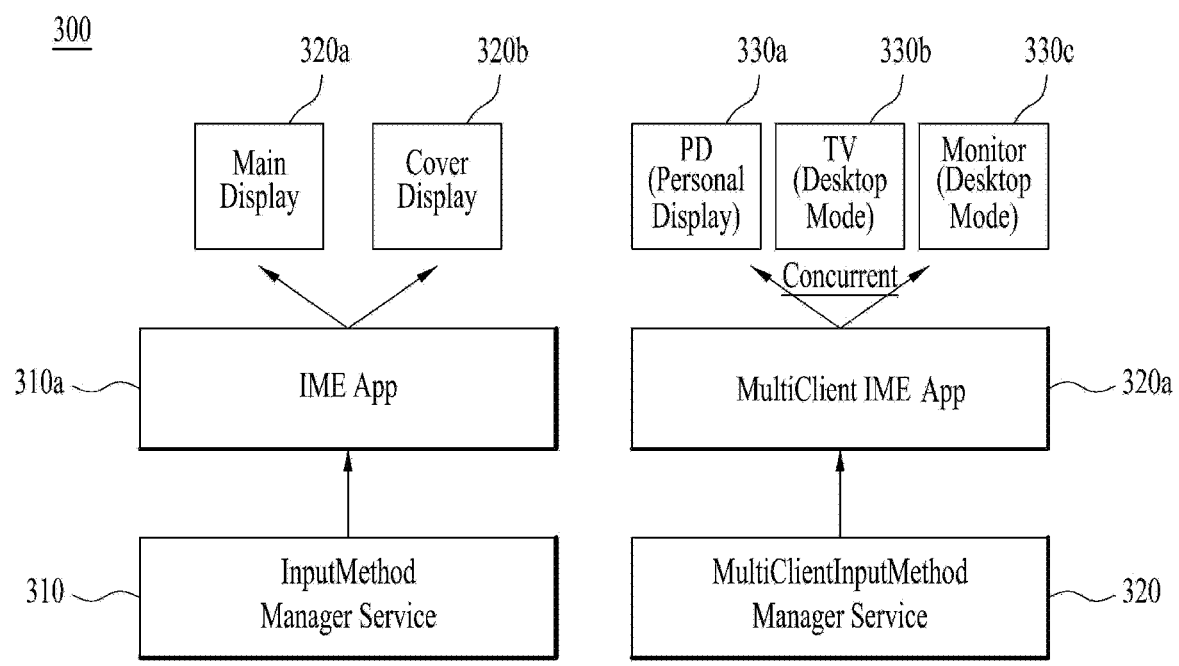
FIG. 3 is a diagram illustrating an operation structure of a mobile terminal according to an embodiment of the present disclosure.

FIG. 3 is a diagram illustrating an operation structure of a mobile terminal according to an embodiment of the present disclosure. The mobile terminal and the display device shown in FIG. 3 can include the above-described modules shown in FIG. 2, and as such redundant description thereof will herein be omitted for brevity or will be briefly provided.

Referring to FIG. 3, an input management service 310 and a multi-client input management service 320 can be included and executed in the mobile terminal 300.

More specifically, when the mobile terminal 300 is booted, it is possible to determine whether the mobile terminal 300 supports multiple displays (hereinafter referred to as 'multi-display'). Here, information about whether to support the multi-display can preferably mean that the mobile terminal 300 can use at least one display unit rather than only one display unit. For example, the mobile terminal 300 can control two or more displays such as a main display 320a and a cover display 320b, as the display unit of the mobile terminal 300. If necessary, the mobile terminal 300 can control a personal display (PD) 330a, a TV 330b, a monitor 330c, etc. as a display unit of the display device, which can preferably external to the mobile terminal 300.

In this case, when the mobile terminal 300 supports the multi-display, the input management service 310 and the multi-client input management service 320 can be executed together.

According to one embodiment of the present disclosure, when the mobile terminal 300 receives a signal requesting output of the input method editor (IME) within the mobile terminal 300, the mobile terminal 300 can output an IME application 310a to the display unit of the mobile terminal 300. As mentioned above, the main display 320a and/or the cover display 320b can be the display unit of the mobile terminal 300.

In one embodiment of the present disclosure, upon receiving a signal requesting output of the input method editor (IME), the mobile terminal 300 can control the IME application 310a to be output to at least one of the main display 320a and the cover display 320b.

In one embodiment of the present disclosure, upon receiving a signal requesting output of the input method editor (IME) from the display device, the mobile terminal 300 can control the multi-client IME application (Multi-Client IME App) 320a to be output to the display unit (e.g., PD 330a, TV 330b, and monitor 330c, etc.) of the display device.

At this time, the IME application 310a output from the mobile terminal 300 and the multi-client IME application 320a output from the display unit of the display device can be output by the different input management services 310 and 320.

In one embodiment of the present disclosure, the input management service 310 can determine which one of the main display 320a and the cover display 320b will be used to display the IME application 310a thereon. For example, the input management service 310 can output the IME application 310a to the main display 320a.

In one embodiment of the present disclosure, the multi-client input management service 320 can determine which one of the display units of the display devices will be used to display the multi-client IME application 320a. For example, the multi-client input management service 320 can output the multi-client IME application 320a to the PD 330a.

In addition, although the embodiment of the present disclosure has described that the input management service 310 and the multi-client input management service 320 are simultaneously executed in the mobile terminal 300 for convenience of description, other embodiments in which the input management service 310 is executed in the mobile terminal 300 and the multi-client input management service 320 is executed in the display device can also be applied without departing from the scope or spirit of the present disclosure.

A more detailed embodiment of the present disclosure will be described later with reference to FIG. 4.

Figure 4:
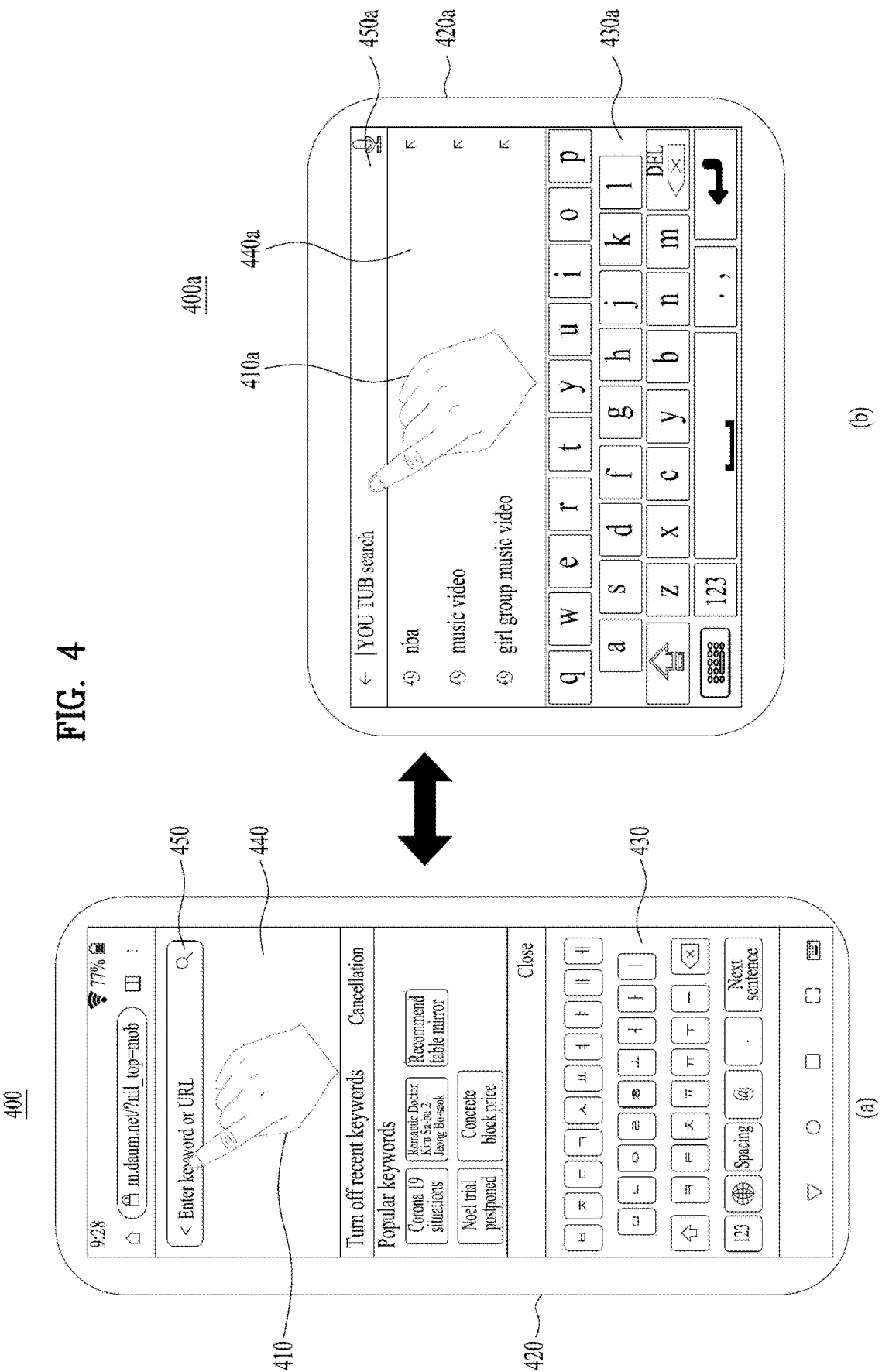
FIG. 4 is a diagram illustrating an example in which an input method editor (IME) of a mobile terminal and an input method editor (IME) of a display device are simultaneously output according to an embodiment of the present disclosure.

FIG. 4 is a diagram illustrating an example in which the input method editor (IME) of the mobile terminal and the input method editor (IME) of the display device are simultaneously output according to an embodiment of the present disclosure. In FIG. 4, the same description as those of FIG. 3 will herein be omitted for brevity or will be briefly provided. A mobile terminal 400 and a display device 400a of FIG. 4 can have the same or similar components/configurations as the previously discussed mobile terminal and display device of the present disclosure.

Referring to (a) of FIG. 4, the mobile terminal 400 can output a first input unit 430 (e.g., IME) onto the first display unit 420 upon receiving a first input signal 410 as an input. Here, the first input signal 410 can correspond to a signal requesting output of the input method editor (IME).

More specifically, the mobile terminal 400 can receive the first input signal 410 while a first application 440 is executed. Here, the first application 440 can include one or more of all applications executable in the mobile terminal 400, and in particular, can correspond to an application capable of receiving user input. The execution and the progress on the execution of the first application 440 can be displayed on a portion of the first display unit 420 as shown in (a) of FIG. 4.

In one embodiment of the present disclosure, the mobile terminal 400 can output a first input method editor (IME) 430 as an example of the first input unit upon receiving the first input signal 410 as an input. At this time, the first input method editor (IME) 430 can be executed based on the generated first input process.

More specifically, the mobile terminal 400 can output the first input method editor (IME) 430 on a display window for the first application 440. An Internet search application can be an example of the first application 440. For example, in a state in which the Internet search application 440 is executed, the mobile terminal 400 can output the first input method editor (IME) 430 to the Internet search application 440 when the first input signal 410 generated when a user input window 450 (e.g., first user input window) is touched is received in the Internet search application 440.

Referring to (b) of FIG. 4, in one embodiment of the present disclosure, the mobile terminal 400 can receive a second input signal 410a from the display device 400a. Here, the second input signal 410a can include a signal requesting output of an input method editor (IME) on the second display unit 420a of the display device 400a. That is, although the second input signal 410a received by the mobile terminal 400 from the display device 400a can be different from the signal requesting output of the input method editor (IME) on the second display unit 420a, the following description assumes that the signal requesting output of the input method editor (IME) on the second display unit 420a is included in the second input signal 410a for convenience of description.

More specifically, the mobile terminal 400 can receive the second input signal 410a while the first application 440 is executed. According to one embodiment of the present disclosure, the mobile terminal 400 can receive the second input signal 410a while the first input method editor (IME) 430 is being output. For instance, the mobile terminal 400 can receive the second input signal 410a from the display device 400a while the Internet search application 440 is being executed.

According to one embodiment of the present disclosure, the second input signal 410a can correspond to an input signal generated when a user input window 450*a* (e.g., second user input window) displayed on the second display unit 420*a* of the display device 400*a* is touched. At this time, the second input signal 410*a* can be input to the second display unit 420*a* of the display device 400*a* in a state in which a second application 440*a* is executed. A video playback application can be an example of the second application 440*a*. For example, in a state in which the video playback application 440*a* is executed, the display device 400*a* can receive the second input signal 410*a* generated when the user input window 450*a* included in the video playback application 440*a* is touched. The execution and the progress on the execution of the second application 440*a* can be displayed on a portion of the second display unit 420*a* as shown in (b) of FIG. 4.

The display device 400*a* can transmit the second input signal 410*a* to the mobile terminal 400 upon receiving the second input signal 410*a* as an input. Therefore, when the mobile terminal 400 receives the second input signal 410*a* from the display device 400*a*, the mobile terminal 400 can control the second input method editor (IME) 430*a* to be output to the second display unit 420*a* of the display device 400*a*. At this time, the second input method editor (IME) 430*a* can be executed based on the second input process generated by the mobile terminal 400.

More specifically, the mobile terminal 400 receives the second input signal 410*a* in a state in which the first input method editor (IME) 430 is output to the first display unit 420, so that the mobile terminal 400 can control the second input method editor (IME) 430*a* to be output to the second display unit 420*a* of the display device 400*a*.

That is, the mobile terminal 400 can output the second input method editor (IME) 430*a* to the display device 400*a* in a state in which the first input method editor (IME) 430 is output on the first display unit 420 of the mobile terminal 400. As such, the mobile terminal 400 controls and outputs both the first and second IMEs 430 and 430*a* at the same time.

Thereafter, the mobile terminal 400 can output a first input received through the first input method editor (IME) 430 to the first display unit 420, and the display device 400*a* can control a second input received through the second input method editor (IME) 430*a* to be output to the second display unit 420*a*.

In addition, according to one embodiment of the present disclosure, the mobile terminal 400 can perform a first function according to the first input, can perform a second function according to the second input, and can control an output screen for the second function to be output to the second display unit 420*a* of the display device 400*a* while controlling an output screen for the first function to be output to the first display unit 420 of the mobile terminal 400.

That is, according to one embodiment of the present disclosure, the signal being input to the display device 400*a* can be transferred to the mobile terminal 400, and a process can be conducted in the mobile terminal 400 to control the resultant screen to be output to the second display unit 420*a* of the display unit 400*a*.

Accordingly, the user can simultaneously use the input method editor (IME) in both the mobile terminal 400 and the display device 400*a*. In addition, the first user uses the first input method editor (IME) 430 being output to the mobile terminal 400, and at the same time the second user can use the second input method editor (IME) 430*a* being output to the display device 400*a*.

Furthermore, although the above embodiments have been described with reference to different drawings for conve- nience of description, the scope or spirit of the present disclosure is not limited thereto, the embodiments described in the respective drawings are combined to implement a new embodiment as necessary.

Figure 5:
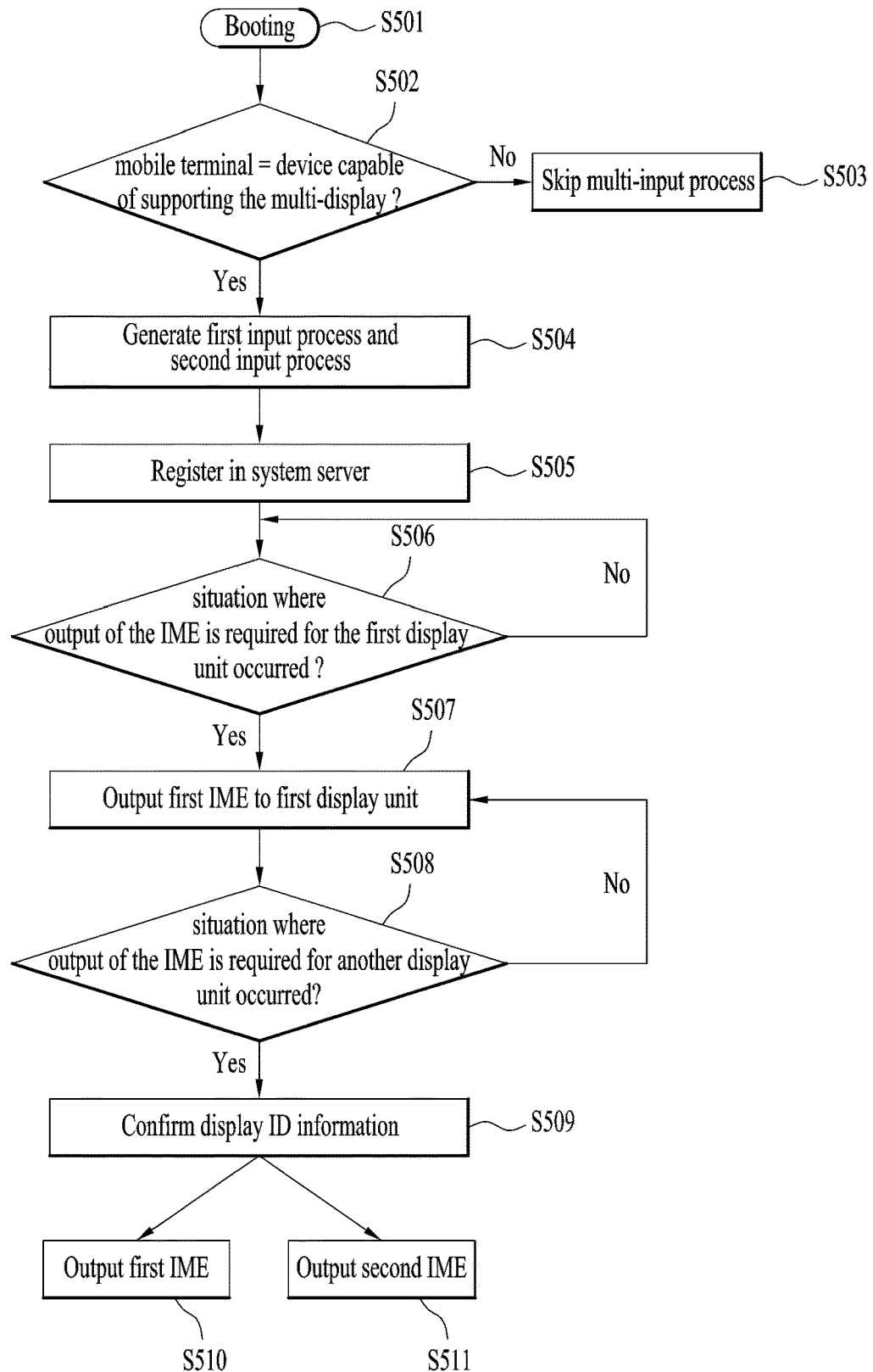
FIG. 5 is a flowchart illustrating an example in which a display device is controlled by a mobile terminal according to an embodiment of the present disclosure.

FIG. 5 is a flowchart illustrating an example in which the display device is controlled by the mobile terminal according to an embodiment of the present disclosure. Hereinafter, each step of FIG. 6 can be controlled by the controller 180 of FIG. 1A, the controller 240 of FIG. 2, or the controller of the mobile terminal 300. The operations of FIGS. 5 and 6 can be performed by any mobile terminal (e.g., 100, 200, 300, 400, etc.) and any display device discussed hereinabove.

Referring to FIG. 5, in step S501, the mobile terminal can be booted.

In step S502, when the mobile terminal is booted, it can be determined whether the mobile terminal is a device capable of supporting the multi-display. Here, information about whether the multi-display is supported can be determined based on specific information indicating whether the mobile terminal can control one or more displays.

In addition, although step S502 has described one embodiment in which, when the mobile terminal is booted, it is determined whether the mobile terminal is a device capable of supporting the multi-display, but is not limited thereto. Of course, after the mobile terminal is booted, it can also be determined whether the mobile terminal is a device capable of supporting the multi-display. In other words, the time point for checking if the mobile terminal is a device capable of supporting the multi-display is not limited to these examples.

If the mobile terminal is a device that does not support the multi-display, the mobile terminal can skip the multi-input process in step S503. More specifically, when the mobile terminal is a device that does not support the multi-display, two or more input processes may not be generated.

If the mobile terminal is a device supporting the multi-display, the mobile terminal can generate a first input process and a second input process in step S504. In this case, the first input process can correspond to the input management service 310 shown in FIG. 3, and the second input process can correspond to the multi-client input management service 320.

More specifically, when the mobile terminal is a device supporting the multi-display, the mobile terminal can and should control two or more display units or a display unit of another device, so that the mobile terminal can generate a plurality of input processes. In this case, the first input process can correspond to a process of outputting a first input method editor (IME) within the mobile terminal, and the second input process can correspond to a second input method editor (IME) within the mobile terminal or the display device external to the mobile terminal.

In step S505, when the first input process and the second input process are generated, the mobile terminal can register the first input process and the second input process into the system server. More specifically, the mobile terminal can register information indicating that the first input process for outputting the IME application is generated in the mobile terminal, into the system server, and can also register information indicating that the second input process for outputting the multi-client IME application is generated in the display device, into the system server.

In step S506, there can occur a situation where there is a need for the input method editor (IME) to be output to the first display unit (e.g., the first display unit 420 of the mobile terminal 400). More specifically, the above situation in which there is a need for the input method editor (IME) to be output to the first display unit can refer to an exemplary case in which the mobile terminal receives the signal requesting output of the input method editor (IME) from the user. For example, the mobile terminal can receive a touch signal generated when the user input window displayed on the main display is touched by the user.

In step S507, the mobile terminal can output the first input unit (e.g., IME) to the first display unit. According to one embodiment of the present invention, when receiving the signal requesting output of the input method editor (IME) from the user, the mobile terminal can output the first input method editor (IME) to the first display unit. For example, upon receiving a touch signal generated when the user input window (e.g., the user input window 450) is touched by the user, the mobile terminal can output the first input method editor (IME) to the main display of the mobile terminal.

In step S508, there can occur a situation where there is a need for the input method editor (IME) to be output to another display unit. More specifically, the above situation in which there is a need for the input method editor (IME) to be output to another display unit can refer to an exemplary case in which another display instead of the first display unit (shown in step S506) receives the signal requesting output of the input method editor (IME) from the user. For example, the display device can receive a touch signal generated when the user touches the user input window displayed on the second display unit (e.g., 420a) of the display device. Alternatively, as another example, the mobile terminal can receive a touch signal generated when the user touches the user input window displayed on the cover display such as the cover display 320b of the mobile terminal 300.

If step S508 is not performed, in one embodiment of the present disclosure, the operation can return to step S507.

In step S509, the mobile terminal can confirm identification (ID) information of the display (or display unit), e.g., upon receiving a signal from the display device. In this case, this signal received by the mobile terminal can include a signal requesting output of the input method editor (IME) on another display unit.

More specifically, upon receiving a request signal for outputting the input method editor (IME) from another display unit, the mobile terminal can confirm identification (ID) information of the display unit having transmitted the corresponding signal. In this case, each display can have a unique ID number, so that the mobile terminal can confirm ID information of each display.

When the ID information of the display is confirmed in step S509, the mobile terminal can output the first input method editor (IME) in step S510, and/or can output the second input method editor (IME) in step S511.

More specifically, in a step (S510), when another display unit that requires the output of the input method editor (IME) through ID information of the display is a display located inside the mobile terminal, the mobile terminal can output the first input method editor (IME) in step S510. For example, when the mobile terminal receives the signal requesting output of the input method editor (IME) from the cover display of the mobile terminal in a state in which the first input method editor (IME) is output to the main display of the mobile terminal, the mobile terminal can output the first input method editor (IME) to the cover display. As a result, an IME is displayed on each of the main display (step S507) and the cover display (step S510).

On the other hand, in step S511, when another display unit that requires the output of the input method editor (IME) through ID information of the display is an external display located outside the mobile terminal, the mobile terminal can control the second input method editor (IME) to be output to the external display.

More specifically, in step S511, when another display unit that requires the output of the input method editor (IME) through ID information of the display is a display of the display device, the mobile terminal can control the second input method editor (IME) to be output to the second display unit (e.g., 420a) of the display device. For example, when the mobile terminal receives the signal requesting output of the input method editor (IME) from the monitor of the display device, the mobile terminal can control the second input method editor (IME) to be output to the monitor of the display device. As a result, an IME is displayed on each of the display of the mobile terminal (step S507) and the display unit of the display device (step S511).

Accordingly, the user of the mobile terminal can use the existing UX (user experience) using the first input method editor (IME) when the display of the mobile terminal is used.

In addition, the user of the mobile terminal can use the first input method editor (IME) and at the same time can use the second input method editor (IME) being output from the display device.

Figure 6:
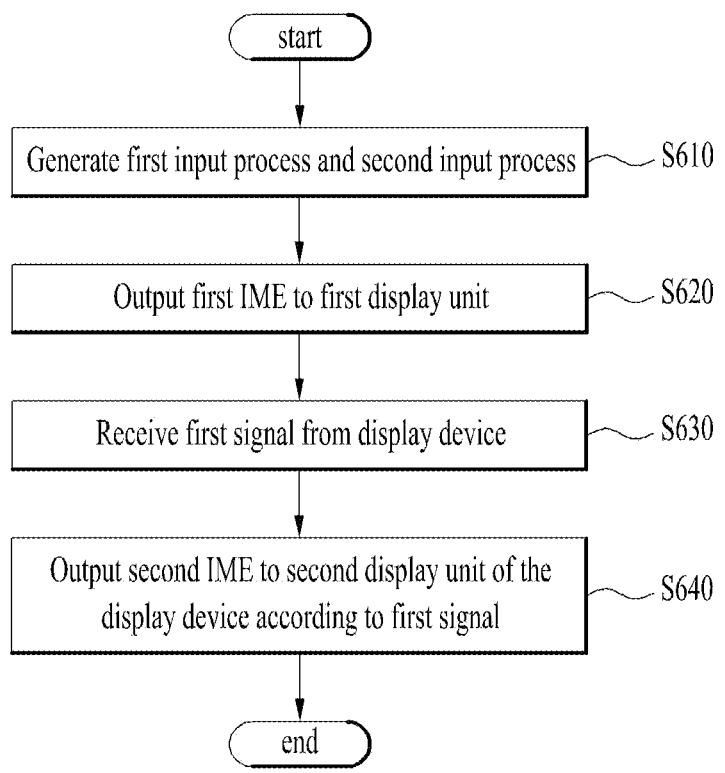
FIG. 6 is a flowchart illustrating another example in which a display device is controlled by a mobile terminal according to an embodiment of the present disclosure.

FIG. 6 is a flowchart illustrating another example in which the display device is controlled by the mobile terminal according to an embodiment of the present disclosure. Hereinafter, each step of FIG. 6 can be controlled by the controller 180 of FIG. 1A, the controller 240 of FIG. 2, or a controller of any mobile terminal discussed herein.

Referring to FIG. 6, in step S610, the mobile terminal can generate the first input process and the second input process. In one embodiment of the present disclosure, the mobile terminal can generate the first input process and the second input process only when the mobile terminal is a device supporting the multi-display.

In step S620, the mobile terminal can output the first input method editor (IME) to the first display unit of the mobile terminal based on the first input process.

In step S630, the mobile terminal can receive the first signal from the display device external to the mobile terminal, such as the display device 400a. In this case, the first signal can include a control signal for allowing the input method editor (IME) to be output to the display device.

In step S640, the mobile terminal can output the second input method editor (IME) to the second display unit of the display device upon receiving the first signal as an input. In this case, the second input method editor (IME) can be output based on the second input process.

In addition, the above-described embodiments described above with reference to FIGS. 2 to 4 can be implemented as a control method of the mobile terminal as shown in FIGS. 5 and 6.

In addition, the above-described methods can be implemented in a program-recorded medium as computer-readable codes. The computer-readable media can include all kinds of recording devices in which data readable by a computer system are stored. The computer-readable media can include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer can include the control unit 180 of the terminal. Therefore, the above embodiments are to be construed in all aspects as illustrative and not restrictive. The scope of the present disclosure should be determined by reasonable interpretation of the appended claims. In addition, the present disclosure covers the modifications and variations of this invention that come within the scope of the appended claims and their equivalents.

Embodiments of the present disclosure are industrially applicable to a mobile terminal and are repeatedly applicable.

The invention claimed is:

1. A mobile terminal comprising:
a wireless communication unit configured to communicate with a display device external to the mobile terminal;
a first display unit; and
a controller configured to control the wireless communication unit and the first display unit,
wherein the controller is configured to:
determine whether the mobile terminal supports a multi-display function when the mobile terminal is booted,
in response to the mobile terminal supporting the multi-display function, execute an input management service and a multi-client input management service,
receive a user input signal from the display device, and
output a second input method editor (IME) for displaying on a second display unit of the display device.

2. The mobile terminal according to claim 1, wherein:
when the controller receives the user input signal from the display device in a state in which a first input method editor (IME) executed based on the input management service is output to the first display unit, the controller controls the second input method editor (IME) to be output to the second display unit in a state in which the output of the first input method editor (IME) is maintained.

3. The mobile terminal according to claim 2, wherein:
the controller controls a first input received through the first input method editor (IME) to be output to the first display unit,
the controller controls a second input received through the second input method editor (IME) to be output to the second display unit, and
the first input and the second input are simultaneously input or received.

4. The mobile terminal according to claim 3, wherein:
the controller performs a first function in the mobile terminal according to the first input, and
the controller performs a second function in the mobile terminal according to the second input so that an output screen for the second function is controlled to be output to the second display unit.

5. The mobile terminal according to claim 2, wherein:
upon receiving the user input signal from the display device, the controller is configured to confirm identification information of the first display unit and identification information of the second display unit.

6. The mobile terminal according to claim 5, wherein:
based on the confirmed identification information, the controller controls the first input method editor (IME) to be output to the first display unit, and controls the second input method editor (IME) to be output to the second display unit.

7. The mobile terminal according to claim 1, wherein:
when the input management service and the multi-client input management service are executed, the controller registers the input process input management service and the multi-client input management service into a server.

8. The mobile terminal according to claim 1, wherein:
the controller executes, simultaneously, the firstthe input management service in the mobile terminal and the multi-client input management service in the mobile terminal or the display device.

9. A method of controlling a mobile terminal configured to wirelessly communicate with a display device external to the mobile terminal, the method comprising:
determining, by a controller of the mobile terminal, whether the mobile terminal supports a multi-display function when the mobile terminal is booted;
in response to the mobile terminal supporting the multi-display function, executing, by the controller, an input management service and a multi-client input management service;
receiving, by the controller, a user input signal from the display device; and
outputting, by the controller, a second input method editor (IME) for displaying on a second display unit of the display device.

10. The method according to claim 9, wherein when the controller receives the user input signal from the display device in a state in which a first input method editor (IME) executed based on the input management service is output to a first display unit of the mobile terminal, the controller controls the second input method editor (IME) to be output to the second display unit in a state in which the output of the first input method editor (IME) is maintained.

11. The method according to claim 10, further comprising:
controlling, by the controller, a first input received through the first input method editor (IME) to be output to the first display unit; and
controlling, by the controller, a second input received through the second input method editor (IME) to be output to the second display unit,
wherein the first input and the second input are simultaneously input or received.

12. The method according to claim 11, further comprising:
performing a first function in the mobile terminal according to the first input; and
performing a second function in the mobile terminal according to the second input so that an output screen for the second function is controlled to be output to the second display unit.

13. The method according to claim 10, further comprising: upon receiving the user input signal from the display device, confirming by the controller identification information of the first display unit and identification information of the second display unit.

14. The method according to claim 13, wherein based on the confirmed identification information, the controller controls the first input method editor (IME) to be output to the first display unit, and controls the second input method editor (IME) to be output to the second display unit.

15. The method according to claim 9, further comprising:
when the input management service and the multi-client input management service are executed, registering by the controller the input management service and the multi-client input management service into a server.

16. The method according to claim 9, wherein the controller executes, simultaneously, the input management service in the mobile terminal and the multi-client input management service in the mobile terminal or the display device.

* * * * *